United States Patent Office 3,417,640
Patented Dec. 24, 1968

3,417,640
ELECTRIC CONTROL MEANS FOR SYNCHRONIZED GEAR SHIFTING IN MOTOR VEHICLE VARIABLE SPEED GEAR BOXES
Karl Heinz Schmidt, Kreis Hersbruck, Vorra, and Benno Bildat, Erlangen, Germany, said Bildat assignor to said Schmidt
Filed Oct. 18, 1965, Ser. No. 497,399
Claims priority, application Germany, Nov. 4, 1964, Sch 36,060
20 Claims. (Cl. 74—866)

ABSTRACT OF THE DISCLOSURE

A gear shifting system for a variable speed gear box transmission having electric generators connected to be driven by the input and output shafts of the gear box to provide electrical quantities responsive to the speeds of these respective shafts. A coupling for momentarily uncoupling the engine drive shaft and the gear box input shaft while the gears are shifted into neutral preparatory to shifting to a preselected gear ratio. Circuit elements having electrical characteristic quantities relatively proportional to the selectable gear ratios of the gear box and connected by a preselector to the input and output shaft generators and an electrical comparing device such that when the gears to be engaged to provide the desired ratio are in synchronism a gear shifting motor is energized to effect the selected engagement after the gears of the gear box are in neutral without further uncoupling the gear box input and engine shafts. In a vehicle having a plurality of driving motors, a locking system is provided for maintaining the same transmission gear ratio for all gear boxes of the driving motors.

---

This invention relates to means for synchronized gear shifting in motor vehicle variable speed gear boxes.

It is known that in order to enable a grating-free gear shifting in motor vehicle variable speed gear boxes there are generally required synchronizing operations which are performed either by the intermediate acceleration or intermediate deceleration of the gear countershaft or by automatically functioning synchronizing devices.

Insofar as the synchronization is carried out by the driver himself who steps on the gas pedal for intermediate gas or on the clutch pedal, as is nowadays still almost generally usual with heavy motor vehicles, there is danger of missing the synchronism of the respective gear members to be engaged by the gear shifting operation, which missing may lead to breakage or damage of the respective members of the motor vehicle speed gear box.

It is known that in order to permit the gear shifting to be effected exactly during the synchronous running of the respective gear members to be engaged there were provided electric control means wherein the speeds of the driving and of the driven shafts, respectively, of the motor vehicle variable speed gear box concerned were transformed by generators in electric voltages or currents, respectively, which are selectively fed to a comparing device via respective resistors graduated in accordance with the transmission ratios of the individual gear speeds, wherein said comparing device delivers an electric signal whenever the electric currents fed to the comparing device and derived from said two generators have been brought into a relation with respect to each other corresponding to the synchronism of the respective gear members to be coupled.

In said known gear shifting means, the electric signal generated by the comparing means serves for energizing a shifting motor and for unlocking a shiftgear ratchet, respectively, which permits the preselected gear to be engaged only when the synchronism of the gear members to be engaged is achieved.

An essential disadvantage of the electric gear shifting means of the above-mentioned type consists in that they cannot be used in conjunction with the gear shifting motors employed in heavy vehicles because the synchro-signal produced by the comparing means can be exceedingly short especially when very sensible comparing means are used, on one hand, and when the speed ranges leading to the synchronism of the gear members to be coupled are traversed very quickly, on the other hand, so that the conventional gear shifting motors are generally incapable of fully performing the gear shifting in response to such short signals.

Accordingly, the object of the present invention is to provide electric control means for synchronized gear shifting in motor vehicle variable speed gear boxes, wherein a preselected gear can be engaged, during the synchronous running of the gear members to be coupled, by a gear shifting motor.

A further object of this invention is to provide electric means for gear shifting wherein the synchronism of the gear members to be coupled is effected automatically.

Finally, it is a further object of this invention to provide electric gear shifting means for the substantially simultaneous synchronized gear shifting of a plurality of parallel-running motor vehicle variable speed gears from a common control stand.

The invention is elucidated in greater detail hereinafter in the description of a number of exemplary embodiments in the light of the accompanying drawings, in which.

Figure 1:
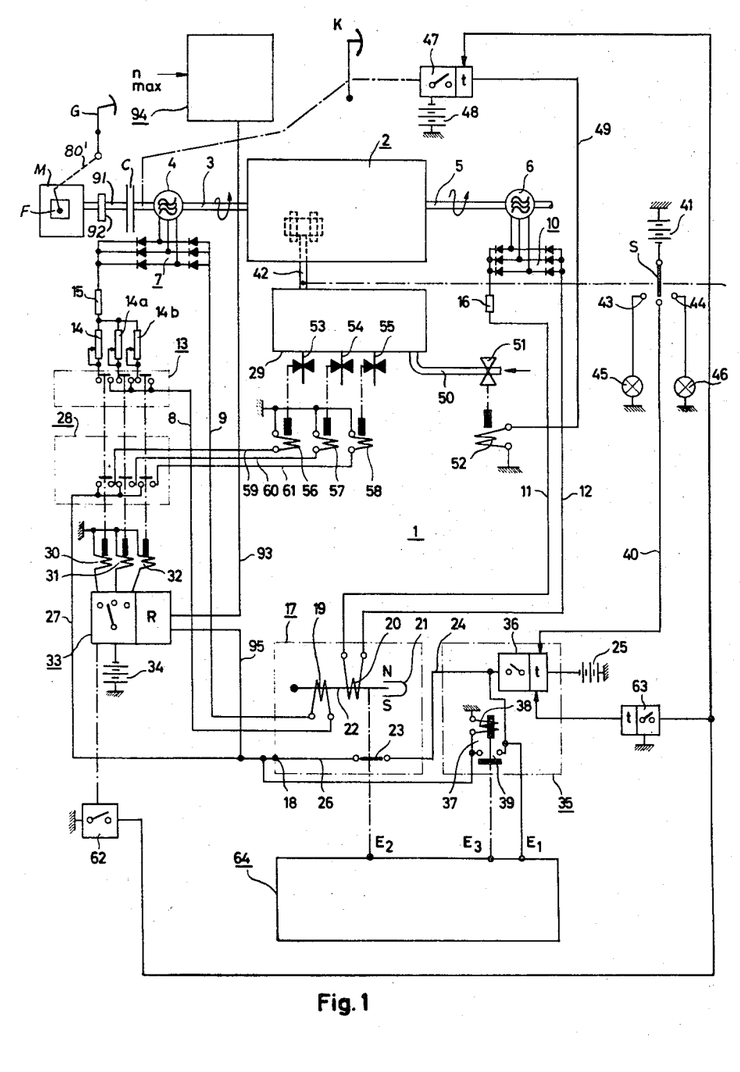
FIGURE 1 shows a wiring diagram of an exemplary embodiment of the electric gear shifting means according to the present invention, wherein some of the circuit members are represented as block symbols.

The electric control means for synchronized gear shifting in motor vehicles variable speed gear boxes is indicated as a whole by the reference numeral 1. Reference numeral 2 indicates a motor vehicle variable speed gear box having a driving shaft 3, to which a three phase A.C. generator or rotary current transmitter 4 is connected, while an identical three phase A.C. generator or rotary current transmitter 6 is coupled to the driven shaft 5. The outputs of the A.C. generator 4 are connected to a pair of leads or lines 8, 9 via three phase two-way rectifier circuit 7, while the outputs of the A.C. generator 6 are connected to a pair of lines 11, 12 via an identical three phase two-way rectifier circuit 10.

In the length of line 8 is provided a switch arrangement 13 by which a determined resistor of a number of resistors 14, 14a, 14b, can be selectively connected to line 8. In addition, in the length of the line 8 there is further provided a current limiting resistor 15. A similar current limiting resistor 16 is located in the length of line 11 associated with the A.C. generator 6.

The magnitude of the individual resistors 14, 14a, 14b, respectively, is selected so that upon connection of a predetermined one of said resistors, equal currents will flow through lines 8 and 9 and lines 11 and 12 whenever the respective ratio of the speeds of the driving shaft 3, on one hand, and of the driven shaft 5, on the other hand, corresponds to the synchronism of the respective gear members to be coupled. The pairs of lines 8, 9 and 11, 12 are connected to a comparator circuit which is indicated as a whole by the reference numeral 17 and which delivers an electric signal at its output 18 when the aforesaid speed ratio or current equality in said pairs of lines is achieved.

It will be readily apparent to one skilled in the art that also D.C. generators can be used directly instead of A.C. generators connected to rectifiers. Besides, according to an embodiment according to the invention which is not shown in the drawings, it is possible that to the driving shaft 3 and to the driven shaft 5, respectively, there are connected respective two phase A.C. generators which are directly connected to the pairs of lines 8, 9 and 11, 12, respectively. In such a case, in line 8 are selectively connectable A.C. resistors which are graduated in accordance with the transmission ratios of the speeds of the motor vehicle variable speed gear box and which ensure that upon synchronism of the respective gear members to be coupled, there will be current equality in the pairs of lines 8, 9 and 10, 11.

The comparator circuit 17 in the arrangement embodying the present invention according to FIGURE 1 of the drawings is designed as a D.C. differential relay including two control windings 19, 20 surrounding a relay armature 22 polarized by a permanent magnet 21. The relay armature 22 serves for actuating a switch 23 which is in the closing position shown in FIGURE 1 of the drawings whenever the control windings 19 and 20 are flowed through by currents of equal magnitude. Switch 23 is connected to a current source 25 via a line 24 and to the output 18 of the comparator circuit 17 via a line 26.

Since the pair of lines 8, 9 is connected to the control winding 19, while the pair of lines 11, 12 is connected to the control winding 20, it will be apparent that upon synchronism of the respective gear members to be coupled, a rectangular pulse having a duration corresponding to the duration of the synchronous running of the gear members to be coupled will appear at the output 18 of the comparator circuit.

When the pairs of lines 8, 9 and 11, 12 are A.C. lines in accordance with a modified embodiment of the invention, then the comparator circuit 17 will be suitably designed as an A.C. differential relay.

The synchro-signal is fed to a gear shifting motor 29 via a line 27 and distributor switch means 28. As is evident from FIGURE 1 of the drawings, the gear shifting motor 29 may include a plurality of control inputs corresponding to the individual gear speeds of the variable speed gear box so that upon their energization the respective gear member will be engaged. Both switch means 13 and 28 are suitably coupled to each other so that upon connection of a predetermined resistor 14, 14a or 14b also the control input—corresponding to the thus preselected speed—of the gear shifting motor 29 will be positively connected to the output 18 of the comparator circuit 17.

In the embodiment of the invention as shown in FIGURE 1 of the drawings, the switch means 13 and 28 are formed by contact sets of relays which are associated with the individual gear speed stages, and the control windings of which are indicated at 30, 31 and 32.

The control windings 30, 31 and 32 of the relays forming the switch assemblies 13 and 28 are selectively connectable to a current source 34 by means of a switch 33 actuable by the driver.

Now, since the length of the synchro-signal delivered by the comparator circuit 17 at its output 18 is generally insufficient to ensure the energization of the gearshift motor 29 during the time which is absolutely indispensable for the respective gear to be shifted so as to be engaged, the comparator circuit is connected—according to a special feature of the invention—to a signal transformer which is indicated by the reference numeral 35 and which can be designed in any form desired, e.g., as a monostable sweep circuit which is not shown in FIGURE 1 of the drawings.

According to FIGURE 1 of the drawings, the signal transformer 35 comprises a delay relay 36 with delayed releasing time connected in the length of line 24 between the switch 23 and the current source 25, and a holding relay 37 which is connected to said delay relay and the control winding 38 of which is connected to a holding circuit in the manner shown in FIGURE 1 of the drawings. The contacts 39 of the holding relay 37 are located parallel to the switch 23 of the polarized differential relay of the comparator circuit 17 and maintain a conductive connection between the lines 24 and 26 also after the switch 23 has been opened during a time interval corresponding to the releasing time occurring once at the delay relay 36.

After this releasing time, the line 24 is disconnected from the current source 25 so that also the control winding 38 of the holding relay 37 becomes currentless and the connection of the line 26 or of the output 18, respectively, of the comparator circuit 17 with the current source 25 is now definitively interrupted.

The release of the delay relay 36 is effected through a relase line 40, through which the delay relay 36 is connected to a switch S, by which the release line 40 can be connected to a current source 41 for releasing the delay relay 36. The switch S is mechanically connected in such a manner to a shifting means 42 indicated symbolically in FIGURE 1 of the drawings in dotted lines that the same connects the current source 41 to the release line 40 whenever the variable speed gear box 2 attains its neutral position.

According to a further feature of the invention, the switch S is provided with further contacts 43, 44, through which suitable gear position indicating means 45, 46 are connected to the current source 41 when the respective gear is engaged.

The driving energy for the gear shifting motor 29 is placed in circuit from the coupling pedal K which is coupled to a second delay relay 47 having delayed releasing time and applying a current source 48 to a switching-in line 49 for connecting the gear shifting motor 29 during a maximum time duration required for a gear shifting operation.

In the embodiment of the invention according to FIGURE 1 of the drawings, the gear shifting motor 29 is formed as a hydraulic or pneumatic differential piston drive including a number of driving cylinders which correspond to the number of the gears to be engaged, said cylinders being designed so that they bring the variable speed gear box 2 into the neutral position whenever fluid under pressure is fed to both cylinder sides, whereas a determined gear associated with the respective cylinder side is engaged whenever a determined cylinder side is vented.

FIGURE 1 of the drawings shows a fluid pressure feed line which is indicated at 50 and the fluid pressure impingement of which is controllable by a control valve 51. The control valve 51 is actuated by electromagnetic drive means 52 via the switching-in line 49 in response to the respective switching condition of the delay relay 47. Furthermore, fluid pressure venting lines which are indicated at 53, 54 and 55, can be selectively opened through corresponding electromagnetically operated valves 56, 57 and 58. The selective energization of the electromagnetically operated valves 56, 57 or 58 is effected through corresponding control lines 59, 60 and 61 from the switch means 28.

Since the time period from the moment of the disengagement of the respective last-engaged gear of the motor vehicle variable speed gear box up to the moment in which the synchronism for the respective next preselected gear is achieved, or in which this preselected gear for the individual gearshift speed stages and directions is engaged can have different magnitudes, it follows that a further decrease of the shifting times in the gear shifting means comprising the fluid pressure operated gear shifting motor according to the present invention is achieved in that according to a further feature of the invention, a further switch 62 is connected to switch 33 so that said switch 62 brings the releasing times of both delays 36 and 47 to an end whenever the switch 33 is closed by the operator. Yet while the delay relay 47 is brought directly to release via the switch 62 when the switch 33 is actuated, the release of the delay relay 36 takes place only upon a further time delay of a definite duration after the switch 62 is actuated because a delay relay 63 with delayed reaction time is interposed between switch 62 and the delay relay 36.

The dimensioning of the length of the reaction time of said relay as well as of the duration of the releasing times of the delay relays 36, 47 is described in greater detail hereinafter in conjunction with the elucidation of the mode of operation of the hitherto described components of the gear shifting means according to the invention.

First, the driver actuates the switch 33 for the purpose of preselecting the respective new gear members to be engaged, in consequence of which a resistor 14, 14a or 14b corresponding to the desired speed is connected to the line 8, on one hand, while the output 18 of the comparator circuit is connected to a control line 59, 60 or 61 associated with the preselected gears, on the other hand. Since the respective previously effective gears are still engaged in the gear box, the armature 22 of the differential relay will be drawn toward one side because of the momentary, different energization of the control windings 19 and 20 so that the switch 23 will be opened and the preselection of the desired speed is completed.

Now the driver momentarily actuates the clutch pedal K so that the clutch C between the driving motor M of the motor vehicle and the motor vehicle variable speed gear box 2 is momentarily disengaged for relieving torque during disengagement of the engaged gear members, on one hand, and so that the delay relay 47 is energized, on the other hand, whereupon the delay relay 47 initiates the supply of the fluid under pressure to the gear shifting motor 29 by way of the line 49, the electromagnetic drive means 52 and the valve 51 so that the motor 29 can readily disengage the respective previously engaged gear during the short disengagement time of the clutch C and thus produce the neutral position in the motor vehicle variable speed gear box 2, whereupon the clutch C is re-engaged directly by the driver. It is emphasized that the remainder of a gear shifting operation for engaging gear members according to the present invention takes place with the clutch C being engaged.

Since the motor vehicle variable speed gear box 2 has been brought into the neutral position, also the switch S has been closed by the actuating means indicated at 42 so that the delay relay 36 is energized from the current source 41 by way of the release line 40. Therefore, the line 24 is now in communication with the current source 25.

Due to the disengagement of the respective previously engaged gears, the speeds of the driving shaft 3 of the gear box and of the driven shaft 5 of the gear box can be varied independently of each other and the speed of the driving shaft 3 is varied so long by a means 64, which will be described in greater detail hereinafter, until the synchronism of the gear members to be brought into engagement is achieved. In the moment of the synchronism there exists the same energization of the control windings 19 and 20 of the differential relay of the comparator circuit 17 so that the switch 23 will be closed and a connection is now produced between the output 18 of the comparator circuit 17 and the current source 25; this connection causes the energization of the holding relay 37. The energization of the respective preselected valve of the electromagnetic venting valves 56, 57 or 58 is therefore not interrupted even when the switch 23 is eventually opened because of a now resulting slight deviation of the speeds of the shafts 3 and 5 of the variable speed gear box 2 from the speed ratio corresponding to the synchronism. As is clearly evident from FIGURE 1 of the drawings, the current source 25 remains in communication with the line 27 until the delay relay 36 is released. The releasing time of the delay relay 36 is adjusted somewhat longer than the releasing time of the delay relay 47 in order to avoid that an already engaged gear is again disengaged because of the premature closure of the venting lines 53, 54 or 55 and a too long-lasting fluid pressure impingement of the fluid pressure feed line 50.

The delay relay 63 serves to ensure the aforesaid order of succession of the release of both delay relays 47 and 36 also when the delay relay 47 has been prematurely brought to release by the switch 62 in the above-described manner. To this end, the delay time of the delay relay 63 is adjusted to the difference between the releasing times of the delay relay 47 and of the delay relay 36.

The means for influencing the speed of the driving shaft 3 of the motor vehicle variable speed gear box 2 for the purpose of producing the synchronism for the respective gear members to be coupled, as indicated at 64 in FIGURE 1 of the drawings, includes three inputs $E_1$, $E_2$ and $E_3$. An automatic engagement of the means 64 takes place through the input $E_1$ as soon as the neutral position of the gear box is attained, i.e., as soon as the driving shaft 3 and the driven shaft 5 of the motor vehicle variable speed gear box 2 can change their speeds independently of each other. The means 64 is controlled through the input $E_2$ in the sense of an acceleration of the driving shaft 3 or a deceleration of the driving shaft 3, while the disconnecting of the means 64 takes place through the input $E_3$ as soon as the synchronism of the respective gear members to be coupled is achieved.

It will be readily apparent that mechanical, electrical or pneumatic-hydraulic signals can be fed to the inputs $E_1$, $E_2$ and $E_3$ as desired which signals can be derived from suitable points of the hitherto described means according to the present invention.

According to FIGURE 1 of the drawings, the engagement signal fed to the input $E_1$ consists of an electric current pulse which is derived from the output of the delay relay 36 and which appears upon the closure of the switch S as soon as the neutral position in the gear box is achieved.

The signal fed to the input $E_2$ consists in a mechanical displacement which is derived from the armature 22 of the differential relay forming the comparator circuit 17 and informs the means 64 about the respective position of the armature prior to the synchronism of the gear members to be coupled so that it will be readily apparent that the position of the armature contains an information as to whether the driving shaft 3 of the motor vehicle variable speed gear box must be accelerated or decelerated in order to achieve the synchronism of the respective gear members to be coupled.

The signal fed to the input $E_3$ consists also in a mechanical displacement which is derived from the pair of contacts 39 of the holding relay 37 and which causes the disconnection of the means 64 in the moment in which the energization of the holding relay 37 takes place because of the arrival of the synchro-signal at the output 18 of the comparator circuit 17.

Figure 2:
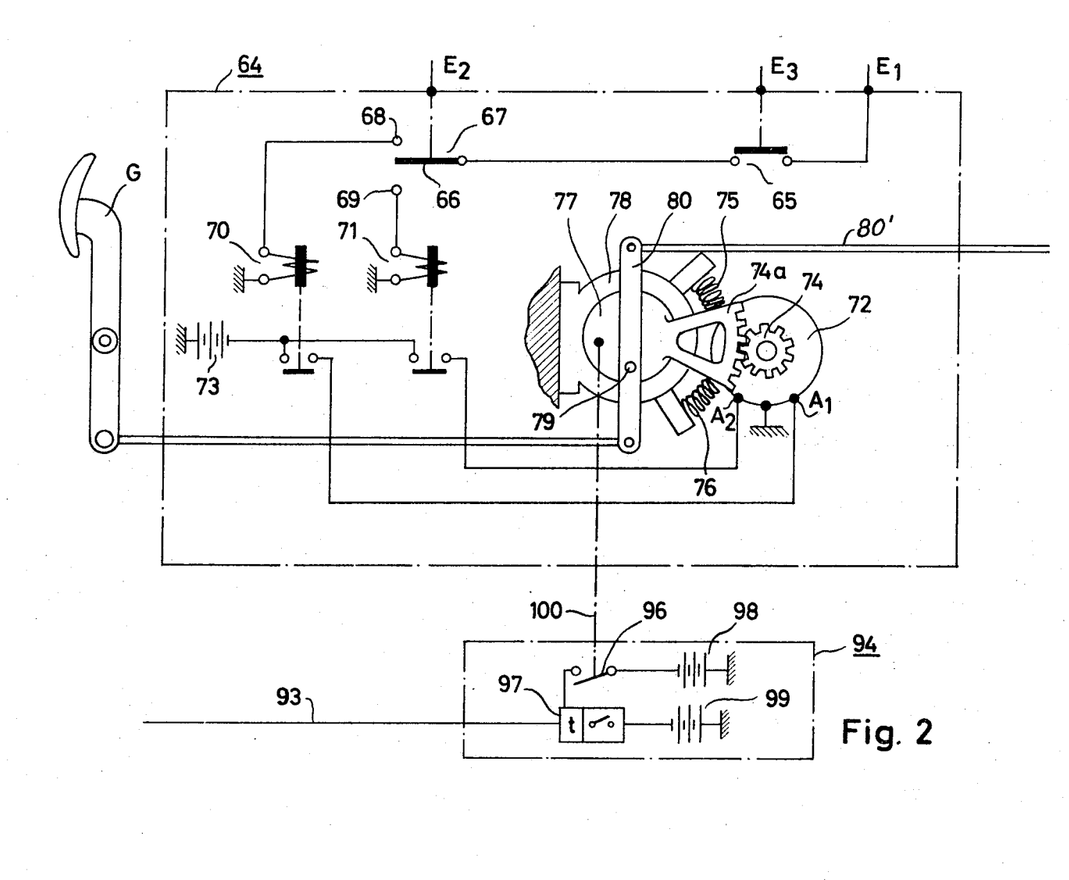
FIGURE 2 shows an exemplary embodiment of a part of the circuit according to the invention as represented in FIGURE 1.

An embodiment, according to the invention, of the arrangement 64 indicated thereinafter as an acceleration or deceleration means is represented in detail in FIGURE 2 of the drawings. The input $E_1$ of the acceleration or deceleration means 64 is connected to a switch 65 which is actuated simultaneously with the pair of contacts 39 of the holding relay 37 by its control winding 38 and comes into the opening position when the control winding 38 is energized. The switch 65 is connected to the contact arm 66 of a changeover switch 67 which is mechanically coupled to the armature 22 of the differential relay of the comparator circuit 17 in the manner shown in FIGURES 1 and 2 of the drawings. The changeover switch 67 includes two contacts 68 and 69 which are in communication with respective switching relays 70 and 71. Two inputs $A_1$ and $A_2$ of a servo motor 72 are selectively connectable to an energy source 73 via the switching relays 70 and 71. The energization of the input $A_1$ corresponds to one rotation of the servo motor 72 in one direction, while energization of the input $A_2$ causes a rotation in the other direction.

The servo motor 72 moves a tooth segment 74a by way of a pinion 74 against the pressure forces of spring 75 and 76 in response to the energization of one respective of its two inputs either in one or in the other direction. The tooth segment 74a is secured to an eccentric 77 which is mounted in a suitable mount 78 secured to the frame. A lever 80 forming a part of a leverage is mounted on the eccentric 77 by a pin 79, while the lever rod 80' connects the gas pedal G to a driving motor fuel regulator F which is not shown in FIGURE 2 of the drawings.

By rotation of the eccentric 77, it is achieved that the fuel regulator F is actuated without any movement by the gas pedal G under the driver's foot. By a corresponding energization either of the input $A_1$ or the input $A_2$ of the servo motor 72, the eccentric 77 is rotated until the driving shaft 3 of the motor vehicle variable speed gear box has been brought, by corresponding regulation of the fuel supply, to the speed corresponding to the synchronism of the respective gear members to be coupled, whereupon the servo motor 72 is disconnected by opening the switch 65 and returned in a determined center position by the force actions of the springs 75 and 76.

Figure 3:
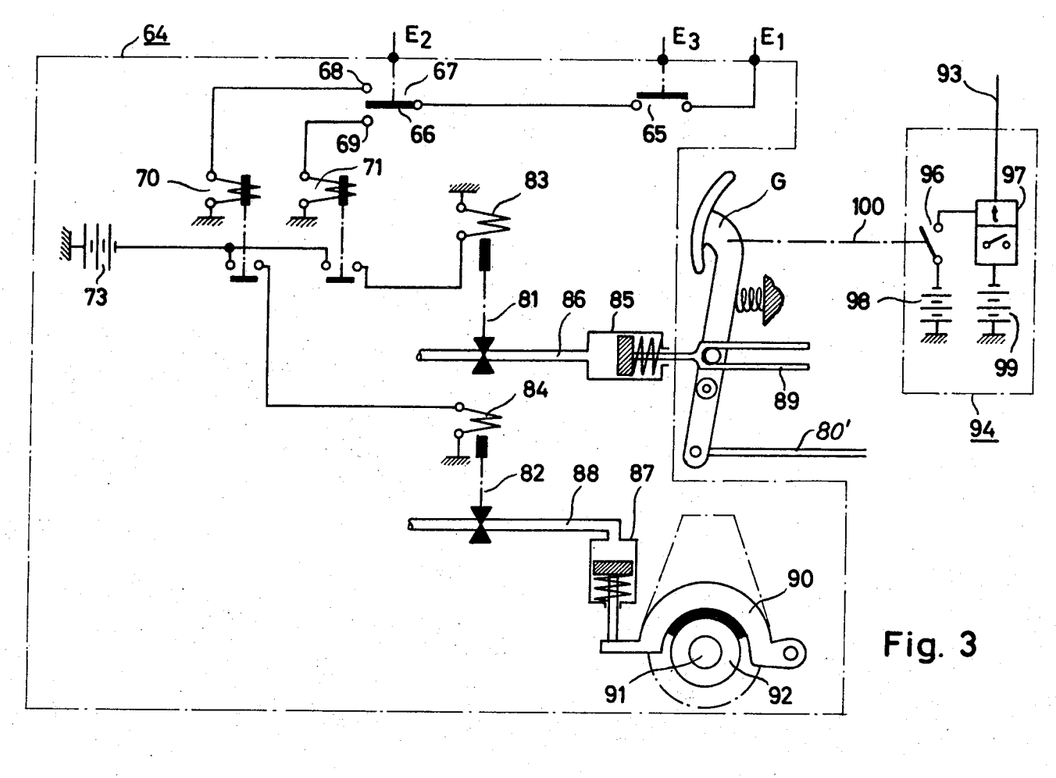
FIGURE 3 shows a further embodiment of the circuit part according to the invention as represented in FIGURE 1.

A further exemplary embodiment of the accelerating or decelerating means indicated as a whole by the reference numeral 64 in FIGURE 1 is shown in FIGURE 3 of the drawings. Equal components as in the embodiment according to the invention of this circuit member according to FIGURE 2 of the drawings are indicated by equal reference numerals also in FIGURE 3.

The selective actuation of electromagnetically controlled valves 81 and 82, the control windings 83 and 84, respectively, of which are selectively connectable to the current source 73 via said switching relay is effected in conjunction with the acceleration or deceleration means 64 according to the invention as shown in FIGURE 3 of the drawings by means of the switching relays 70 and 71. The valve 81 is located in the length of a fluid pressure line 86 leading to a fluid pressure driving means 85, while the valve 82 is located in the length of a fluid pressure line 88 leading to a fluid pressure driving means 87. The fluid pressure driving means 85 acts on the gas pedal G so as to increase the speed of the vehicle motor, as is conventionally done by automotive accelerator pedals, in the manner shown by way of example in FIGURE 3 through a fork 89, whereby the speed of the drive shaft 91 of the vehicle motor is increased; while the fluid pressure driving means 87 actuates a brake shoe 90 which rests on a brake disk 92 securely connected to the motor shaft 91 to provide for slowing down the vhicle motor drive shaft 91 and consequently correspondingly slowing down the gear box driving shaft 3 driven thereby through any suitable driving connection.

Either the fluid pressure drive means 85 or the fluid pressure drive means 87 is impinged with fluid under pressure in dependency upon the position of the relay armature 22 prevailing prior to the synchronism of the respective gear members to be coupled, and thus in dependency upon the position of the changeover switch 67 so that the speed of the driving shaft 3 of the motor vehicle variable speed gear box 2, driven by the vehicle motor drive shaft, is changed in the sense of establishing the synchronism. In other respects, the mode of operation of the above described arrangement corresponds to the mode of operation of the acceleration or deceleration means 64 shown in FIGURE 2 of the drawings.

According to a further aspect of the invention, the switch 33 which is controlling the energization of the relay control windings 30, 31 or 32 and which is actuated by the driver is connected to a resetting means R shown in FIGURE 1, which serves for moving the switch 33 into a position corresponding to the respective next higher gear speed in case it should turn out that upon a determined shifting operation the speed of the driving shaft 3 of the motor vehicle variable speed gear box 2—which speed is necessary for producing the synchronism of the gear members corresponding to the respective preselected gear speed—cannot be achieved by acceleration by the means 64. As is evident from FIGURE 1 of the drawings, the resetting means R is connected to a signal source 94—represented as a block symbol in FIGURE 1—by way of a release line 93 so as to release the resetting means R by dint of a current pulse as soon as a predetermined maximum speed of the driving shaft 3 of the motor vehicle variable speed gear box 2 is achieved, without engagement of the respective preselected gear.

Yet when the synchronism of the gear members to be coupled has been achieved, then—according to the invention the resetting means R is rendered inoperative by a disconnecting line 95 connected to the output 18 of the comparator circuit 17. In FIGURES 2 and 3 of the drawings is represented an embodiment of the signal source 94 containing a switch 96 through which a delay relay 97 with delayed reaction time is energizable from a current source 98. Upon expiry of said reaction time, the delay relay 97 connects the switching-in line 93 to a current source 99 which causes the switching-in of the resetting means R. The actuation of the switch 96 takes place in a predetermined limit position of the eccenter 77 or of the gas pedal G, respectively, through a suitable mechanical coupling 100 so that these positions correspond to a respective predetermined maximum speed of the driving shaft 3 of the gear box.

Figure 4:
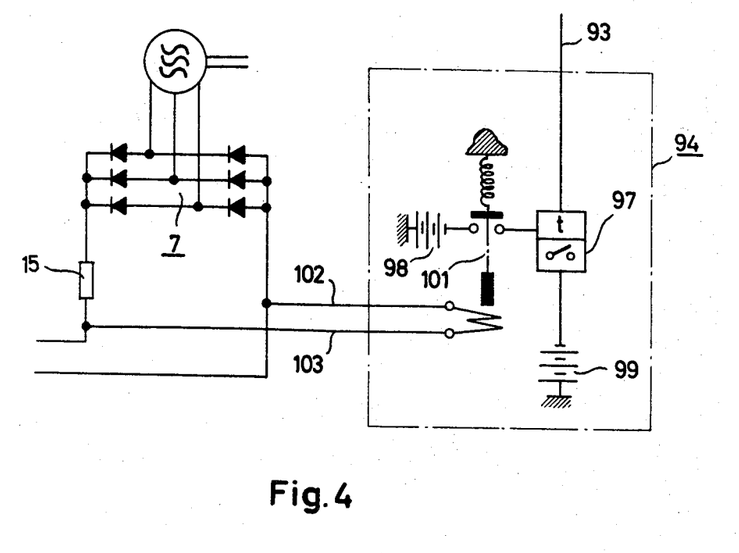
FIGURE 4 shows a further embodiment of a part of the circuit according to the invention as represented in FIGURE 1.

According to a modified form of this part of the shifting means according to the invention as represented in FIGURE 4 of the drawings, the signal source 94 can be formed also by a voltage-sensitive relay 101 which is connected via the lines 102 and 103 to the output of the rectifier circuit 7 associated with the driving shaft of the variable speed gear box, and which connects the current source 98 to the delay relay 97 in the sense of an energization of the delay relay 97 when a predetermined maximum voltage appears at said rectifier circuit, whereupon the delay relay 97 connects the switching-in line 93 to the current source 99.

Figure 5:
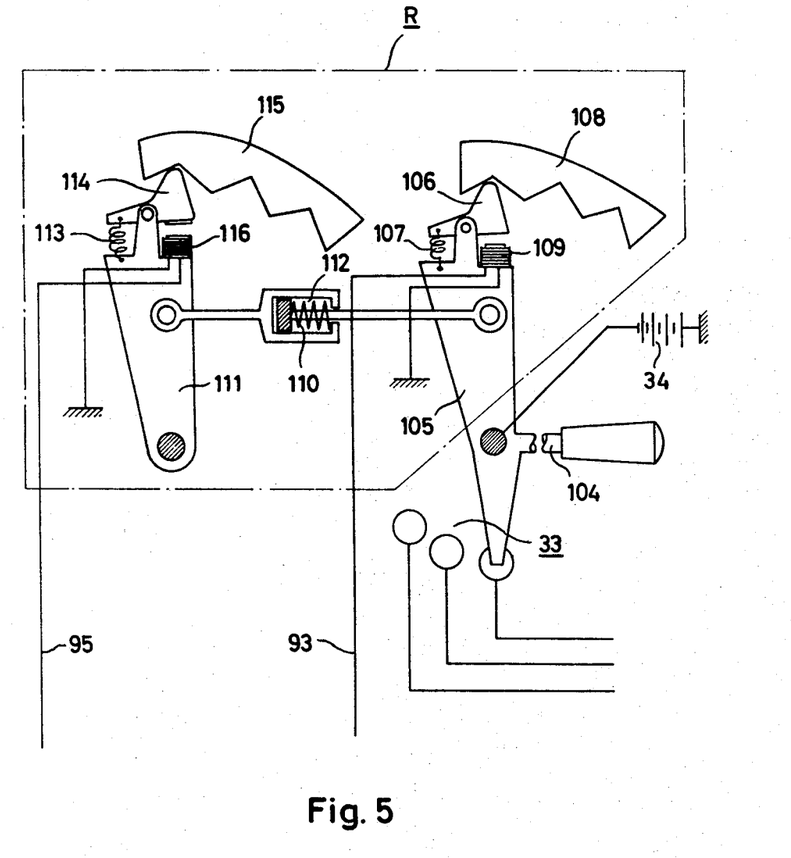
FIGURE 5 shows an embodiment of a further part of the gear shifting means according to the invention as represented in FIGURE 1.

The switch 33 together with the resetting means R is represented in a principle-sketch in FIGURE 5 of the drawings. The resetting means R positively connected to the switch 33 has the form of a ratchet and pawl or dog mechanism including a main ratchet lever 105 positively moved with the contact arm 104 of switch 33. This main ratchet lever is provided with a pawl 106 urged against the notches of a notched or toothed sliding member 108 under the force of a draw-spring 107. The notches of member 108 corresponding to the individual speeds preselectable by means of the switch 33.

The arrested pawl 106 can be released by a solenoid 109 which is energizable via said switching-in line 93 from the delay relay 97. A follower ratchet lever 111 is connected to the main ratchet lever 105 upon interposition of a backlash corresponding to the size of a toothed notch spacing as schematically shown at 110. In the connection between both levers 105 and 111 is interposed a spring 112 which tends to maintain said backlash. The follower ratchet lever 111 does also have a pawl 114 biased by a draw-spring 113 and coooperating with a member 115 corresponding to member 108. The springs 112, 113 and 107 are designed so that the arresting effect of the springs 113 and 107 is stronger than the effect of the force of spring 112 within the backlash at 110. The connection between the main ratchet lever 105 and the follower ratchet lever 111 is such that upon adjustment of the contact arm 104 of switch 33 for shifting from low into higher gears, the follower ratchet lever is moved into a position which exactly corresponds to the main ratchet lever, while during shifting from a higher into a lower gear the follower ratchet lever will remain behind the corresponding position of the main ratchet lever a distance equal to a notch.

Therefore, when a determined maximum motor speed is achieved during a gear shifting operation upon acceleration of the driving gear shaft without producing synchronism of the gear members to be coupled, then the arrested main ratchet lever 105 is released by way of the delay relay 97 so that the switch 33 is returned into a position corresponding to the respective next successive higher gear.

According to the invention it is possible that also the pawl 114 of the follower ratchet lever 111 be released by way of the disconnecting line 95 similarly to the pawl 106 of the main ratchet lever by means of a solenoid 116 in the manner shown in FIGURE 5 of the drawings so that the follower ratchet lever returns into a position corresponding to the main ratchet lever as soon as the engagement of a lower gear has really taken place upon the preselection of such a lower gear.

In particularly heavy vehicles having a great number of driven axles or driven wheels, respectively, sometimes there are used several equal driving motors, the fuel supply of which is controlled by the driver from a single common gas pedal. By means of the shifting device according to the invention by means of a plurality of shifting units according to the invention it is possible to simultaneously shift motor vehicle variable speed gears—which are associated with the respective driving motors and which are separated from each other yet equal to each other—during the synchronism of the respective gear members to be coupled.

On the strength of differences owing to manufacture, it is possible that the individual vehicle motors respond with different speed to the acceleration or deceleration means 64 during a gear shifting operation so that the moment in which the synchronism of the respective gear members to be coupled is achieved, will be achieved at different times by the individual gear driving shafts of the different motor vehicle variable speed gear boxes. In such a case the engagement of the respective preselected gear in the individual gear boxes takes place at different moments. Now, in order to avoid that the driver should cause all of the vehicle motors to yield performance by depressing the gas pedal before the shifting operation in all of the motor vehicle variable speed gear boxes is completed, there is provided a locking means which may be designed according to he embodiment shown in FIGURE 6 of the drawings.

Figure 6:
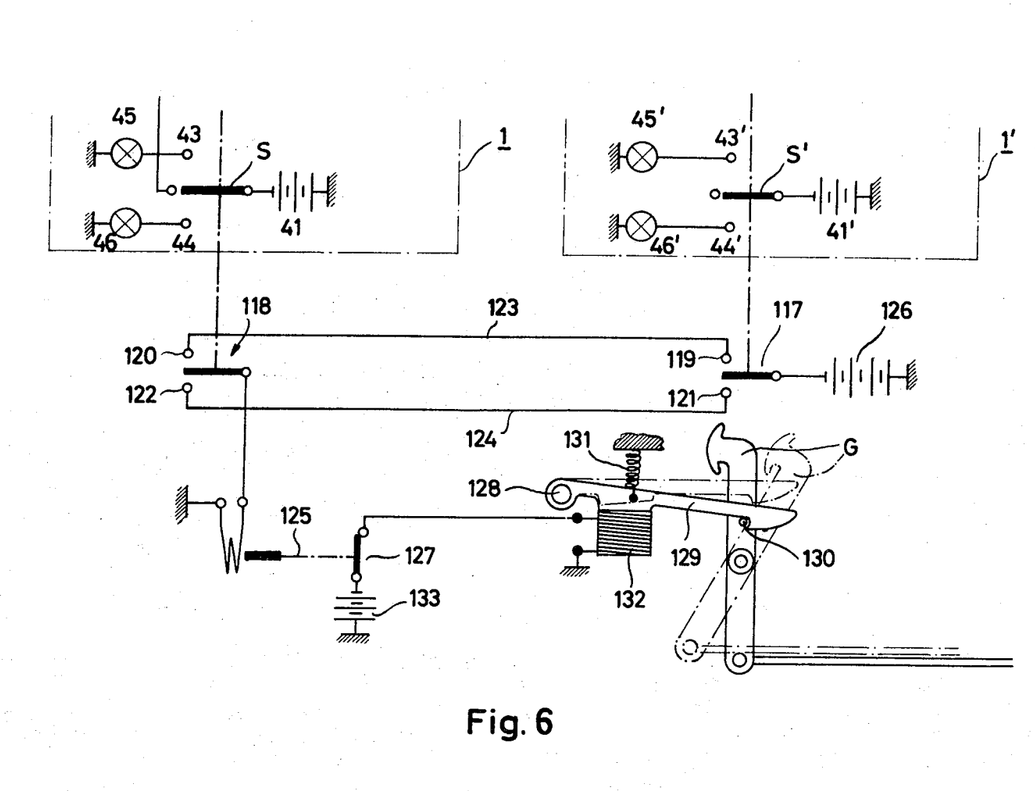
FIGURE 6 shows a further development of the electric gear shifting means according to the invention for use in a plurality of motor vehicle variable speed gears connected in parallel.

FIGURE 6 shows two electric shifting means according to the invention, which are indicated at 1 and 1' and which can substantially be embodied exactly as the shifting means according to the invention as represented in FIGURE 1 of the drawings, and which are associated to respective equal variable speed gears driven by individual motors. The switches S and S' of the switch means 1 and 1' according to FIGURE 6 of the drawings are connected to respective changeover switches 117 and 118, the changeover contacts 119, 120, 121 and 122, respectively, of which are interconnected in pairs via lines 123 and 124 in the manner shown in FIGURE 6 of the drawings. The contact arm of the changeover switch 118 is connected to a relay 125, while the contact arm of the changeover switch 117 is applied to a terminal of a current source 126 which energizes the switching relay 125 for opening its switching contacts 127 when equal positions of both changeover switches 117 and 118 are achieved.

Within the range of the gas pedal G there is mounted at 128 a pawl 129, which is secured to the frame and which cooperates with a pin 130 provided at the gas pedal G. The pawl 129 is normally drawn away from the range of the pin 130 by a draw-spring 131. At the side of the pawl 129 opposite the draw-spring 131 there is arranged a solenoid 132 which is energizable from a current source 133 via the contacts 127 of the switching relay 125 and which attracts the pawl 129 into the range of the pin 130 against the resistance of the spring 131.

Now, if the driver has momentarily released the gas pedal at the commencement of the shifting operation, then the gas pedal will be locked in the unstressed position by the pawl 129 and the pin 130 as soon as the neutral position in any of the variable speed gear boxes of the vehicle concerned is achieved so that the locking effect is maintained until corresponding engaged positions are achieved in all of the gear boxes and hence equal positions of the changeover switches 117 and 118, whereupon the switching relay 125 will be energized, the contacts 127 opened and thus the energization of the solenoids 132 brought to an end.

While in FIGURE 6 of the drawings there are shown only two shifting means 1 and 1' and correspondingly two variable speed gear boxes and two vehicle motors connected thereto being provided, it will be apparent that the arrangement shown in FIGURE 6 of the drawings according to the invention can be used also in a greater number of motor vehicle motors and variable speed gear boxes. In such a case, further switches are provided, which are arranged in the length of the lines 123 and 124 and which are effective so that only then will a connection take place between the current source 126 and the switching relay 125 when in all of the gear boxes there is achieved the same engagement position.

Furthermore, it is self-evident to those skilled in the art that the means according to the invention as shown in FIGURE 1 of the drawings can be used in motor vehicle variable speed gear boxes including a greater number than three different gear engaged positions so that a correspondingly greater number of electric circuit elements after the nature of the circuit elements 14, 14a and 14b as well as a correspondingly greater number of switches will be provided in the switching assemblies 13 and 28.

Furthermore, in such a case it is possible to provide a greater number of switches S, the contact paths of which are closed in the neutral position and are now connected parallel to each other between the current source 41 and the release line 40.

What is claimed is:

1. Electric control means for synchronized gear shifting in a variable speed gear box for a vehicle driven by a motor, comprising a gear box having engageable gear members and a driving input shaft and a driven output shaft, means including a driving coupling for connecting said driving input shaft to a driving motor shaft, gear shifting means, means for controlling operation of said gear shifting means to neutral position of said gear members, means for generating a first electric quantity representing the speed of said driving shaft of the gear box, means for generating a second electric quantity representing the speed of said driven shaft of the gear box, means for comparing said first and second electric quantities derived from said generating means, a plurality of selectably interconnectable circuit elements connected between one of said generating means and said comparing means, each of said circuit elements having an electrical characteristic quantity of a magnitude corresponding to a particular transmission ratio, means for selecting a predetermined transmission ratio between gear members of said gear box to be coupled, said comparing means providing a signal whenever synchronism of the gear members selected to be coupled is established, means for activating said gear shifting means in response to said signal when said gear members have been shifted to neutral for engaging the respective selected gear members without disengaging the driving coupling between the driving motor and said driving shaft of the gear box, and pulse transforming means connected to said comparing means for extending the length of said signal to a period corresponding to the inherent activation time of said gear shifting means.

2. Electric control means as defined in claim 1 wherein said driving coupling is of the disengageable type and the vehicle motor has a drive shaft, said means for controlling operation of said gear shifting means including means for disengaging said coupling before shifting said gear members to neutral position and for subsequently reengaging said driving coupling, vehicle motor fuel supply regulator means, first servo motor means acting on said fuel supply regulator means of the vehicle motor for accelerating said gear box driving shaft, brake means for said motor drive shaft, second servo motor means for operating on said brake means for decelerating said motor drive shaft and said driving shaft of said gear box, said first and second servo motor means being capable of accomplishing synchronism of gear members to be engaged, means for automatically selectively activating said first and second servo motor means in response to the presynchronous condition of said comparing means indicating the need for the acceleration or deceleration of the driving gear of the gears to be engaged to bring it into synchronism with the gear with which it is to be meshed and being subsequently automatically energized whenever the neutral position of the gear box gear members has been established and then being deenergized in response to said signal of said comparing means.

3. Electric control means as defined in claim 1 having means for accelerating and decelerating said driving shaft of said gear box for accomplishing synchronism of the gear members to be engaged, said accelerating and decelerating means automatically effecting said acceleration or deceleration dependent on the presynchronous condition of said comparing means and being subsequently automatically energized whenever the neutral position of the gear box gear members has been established and then being deenergized in response to said signal of said comparing means.

4. Electric control means as defined in claim 1 wherein the vehicle motor has a driving shaft drivingly connected to said gear box driving shaft, vehicle motor fuel supply regulator means, first servo motor means acting on said fuel supply regulator means of the vehicle motor and being capable of accelerating said driving shaft of said gear box, brake means for said motor drive shaft, second servo motor means for operating on said brake means and being capable of decelerating said motor drive shaft and said driving shaft of said gear box, said first and second servo motor means being adapted for accomplishing synchronism of the gear members to be engaged, change-over switch means connected for operation by said comparing means in response to the presynchronous condition of said comparing means for selectively energizing either said first servo motor means or said second servo motor means, a plurality of gear shifting members, a further switch means operable by any of said plurality of gear shifting members whenever the neutral position of the gear box gear member has been attained for energizing said first and second servo motor means through said change-over switch means, and means for subsequently denergizing the energized servo motor means in response to said signal of said comparing means.

5. Electric control means for synchronized gear shifting in a motor vehicle variable speed gear box having engageable gear members and an input driving shaft and an output driven shaft with means including a coupling for connecting said input driving shaft to a motor shaft, comprising an AC-generator coupled with the driving shaft of the gear box, an AC-generator coupled with the driven shaft of the gear box, separate rectifier means connected to the outputs of each of said generators and delivering direct currents variable in accordance with the speeds of said driving shaft and said driven shaft respectively, a polarized differential relay having two control windings and having a pair of contacts maintained in closed position during equal energization of said two control windings, means for selecting a predetermined transmission ratio between gear members comprising a plurality of resistor means selectably interconnectable between one of said relay control windings and one of said rectifier means, each of said resistor means having a resistance magnitude relative to the other resistor means corresponding with a selectable particular transmission ratio, the other relay control winding being directly connected to the other of said rectifier means, gear shifting means, means for operating said gear shifting means to neutral position of said gear members, actuating means connected for operation of said gear shifting means when said gear members are in neutral and responsive to closure of said pair of relay contacts to shift the respective gear members being engaged without disengaging the driving coupling between the driving motor and the driving shaft of the gear box, and means maintaining an electrically conductive connection between said contacts over a period being adjusted to meet the inherent activation period of said gear shifting means.

6. Electric control means for synchronized gear shifting in a variable speed gear box for a vehicle driven by a motor having a drive shaft, comprising a gear box having engageable gear members and an input driving shaft with a driving connection to the vehicle motor drive shaft and an output driven shaft, an AC-generator coupled with the driving shaft of the gear box, an AC-generator coupled with the driven shaft of the gear box, separate rectifier means connected to each of the outputs of said generators and delivering direct currents variable in accordance with the speeds of said driving shaft and said driven shaft respectively, a polarized differential relay having two control windings and having a pair of contacts maintained in closed positions during equal energization of said two control windings, a holding relay connected across said pair of relay contacts, a plurality of resistor means having relative resistance magnitudes corresponding with a selectable particular gear transmission ratio of said gear box, means for selectively connecting one of said resistor means between one of said rectifier means and one of said polarized relay control windings, means directly connecting the other rectifier means to the other of said polarized relay control windings, electrically operable gear shifting means having a plurality of gear shifting members and being connected to one of said contacts of said polarized differential relay, means for operating said gear shifting means to neutral position of said gear members, an electrical energy source, a holding relay having a selectably adjustable holding time adjusted to meet the inherent activation delay of said gear shifting means, means connecting said electrical energy source to the other contact of said polarized relay through said adjustable holding time relay, switch means coupled to any of said plurality of gear shifting members and connected so as to be closed whenever the gear box members are in neutral position and electrically connected to said holding relay for energizing said relay on closure of said switch means, said gear shifting means shifting the preselected gears into engagement after said neutral position is attained without disengaging the driving connection between the driving motor of the vehicle and the driving shaft of the gear box during said shifting whenever synchronism of the gear members to be coupled has been established.

7. Electric control means as defined in claim 6, including vehicle motor fuel supply regulator means, first servo motor means acting on said fuel supply regulator means of the vehicle, brake means on said vehicle motor drive shaft, second servo motor means acting on said brake means for controlling the speed of said driving shaft of said gear box, said first and second servo motor means respectively being capable of acelerating and decelerating said driving shaft of said gear box, for establishing synchronism of gear members to be engaged, changeover switch means connected for controlling the selective operation of said first and second servo motor means, said change-over switch means being mechanically connected to the armature of said differential relay and being operated dependent on the instantaneous position of said armature for being optionally and automatically energized, said energization taking place automatically whenever the neutral position of the gear box gear members has been established via a separate pair of contacts of said holding relay, which separate pair of contacts is closed when said holding relay is deenergized, and said servo-motor means being deenergized when said separate pair of contacts is opened by energization of said holding relay.

8. Electric control means for synchronized gear shifting in a motor vehicle variable speed gear box as defined in claim 6, wherein said switch means coupled to said gear shifting members comprise pairs of contacts each closed in the engaged position of the respective gear, and gear-position-indicating means connected to and operable by said switch means.

9. Electric control means for synchronized gear shifting in a variable speed gear box for a vehicle driven by a motor, comprising a gear box having engageable gear members and a driving input shaft and a driven output shaft, means for providing a driving connection between said motor and said input shaft, means for generating a first electric quantity representing the speed of said driving shaft of the gear box, means for generating a second electric quantity representing the speed of said driven shaft of the gear box, means for comparing said first and second electric quantities derived from said generating means, a plurality of circuit elements each having an electrical characteristic quantity relatively corresponding in magnitude to a particular transmission ratio of said gear box, selector switch means for selectably interconnecting said circuit elements between one of said generating means and said comparing means, electrically responsive gear shifting means having a plurality of separate inputs, means for operating said gear shifting means to neutral position of said gear members, said comparing means generating a signal whenever synchronism of the gear members to be coupled has been established, means coupled to said selector switch means for feeding said signal to a particular input of said gear shifting means, said gear shifting means having a plurality of actuators each being capable of providing engagement of predetermined sets of said gear members when said members are in neutral and each actuator being responsive to energization by said signal of one of said gear shifting means inputs, and pulse transforming means connected to said comparing means and extending the pulse length of said signal fed to a particular one of said inputs of said gear shifting means to a period corresponding to the inherent activation period of said gear shifting means, said gear shifting means shifting the respective preselected gear without disengaging the driving connection between the driving motor of the vehicle and the driving input shaft of the gear box whenever synchronism of the gear members to be coupled has been established.

10. Electric control means as defined in claim 9, comprising resetting means for said selector switch means, an electrical source, switch means connected between said resetting means and said electrical source, a fuel supply regulating means having a fuel pedal for controlling the fuel supply to the vehicle motor, linkage means connecting said fuel pedal to said switch means for closing said switch means when said fuel supply regulating means has attained a definite position corresponding with a definite maximum speed of the driving shaft of said gear box, and said resetting means being operably connected to said selector switch means to reset the gear box to a lower transmission ratio by virtue of a current pulse from said closed switch means.

11. Electric control means as defined in claim 9 comprising an electrically responsive resetting means acting on said selector switch means, a signal source connected to said resetting means and being adapted to generate a monitoring signal for energizing said resetting means whenever a definite maximum speed of the driving shaft of said gear box is attained, said gear box being reset to a lower transmission ratio by virtue of said resetting means upon energization by said monitoring signal of said signal source.

12. Electric control means as defined in claim 9, comprising resetting means for acting on said selector switch means to reset said gear box to a lower transmission ratio, delay time relay means, other relay means connected for operation at a predetermined maximum of said electric quantity representing the speed of the driving shaft of said gear box, an electrical source, said other relay means connecting said electrical source for providing a monitoring signal which energizes said delay time relay means for controlling in turn the energization of said resetting means.

13. Electric control means as defined in claim 9, comprising a signal source being adapted to generate a monitoring signal whenever a definite maximum speed of the driving shaft of said gear box has been attained, resetting means acting on said selector switch means for resetting said gear box to a lower transmission ratio, said resetting means comprising ratchet means connected to said selector switch means, said ratchet means including main ratchet lever means rigidly connected to said selector switch means and having a first spring-loaded pawl and a rack means engaged thereby and having a plurality of teeth corresponding with the number of engageable gears, electromagnetic means responsive to said monitoring signal for releasing said first pawl, said ratchet means further including follower ratchet lever means mechanically connected with backlash to said main ratchet lever means, both lever means being coupled to each other by spring means, said follower ratchet lever means also having a spring-loaded pawl engaging rack means corresponding with said first rack means, said backlash and the spring forces acting on said first and second pawls being adequately dimensioned such as to hold said follower ratchet lever means behind said main ratchet lever means for a distance corresponding with one tooth of said rack means whenever said selector switch means is positioned for preselecting a higher transmission ratio and to set the follower ratchet lever means into a position exactly corresponding with the position of said main ratchet lever means whenever said selector switch means is positioned for preselecting a lower transmission ratio.

14. Electric control means as defined in claim 9, comprising a signal source being adapted to generate a monitoring signal whenever a definite maximum speed of the driving shaft of said gear box has been attained, resetting means acting on said selector switch means for resetting said gear box to a lower transmission ratio, said resetting means comprising ratchet means connected to said selector switch means, said ratchet means including main ratchet lever means rigidly connected to said selector switch means and having a first spring-loaded pawl and rack means engaged thereby and having a plurality of teeth coresponding with the number of engageable gears, electromagnetic means responsive to said monitoring signal for releasing said first pawl, said ratchet means further including follower ratchet lever means mechanically connected with backlash to said main ratchet lever means, both lever means being coupled to each other by spring means, said follower ratchet lever means also having a spring-loaded pawl engaging rack means corresponding with said first rack means, electromagnetic means responsive to said signal generated by said comparing means for releasing said spring-loaded pawl, said backlash and the spring forces acting on said first and second pawls being adequately dimensioned such as to hold said follower ratchet lever means behind said main ratchet lever means for a distance corresponding with one tooth of said rack means whenever said selector switch means are positioned for preselecting a higher transmission ratio and to set the follower ratchet lever means into a position exactly corresponding with the position of said main ratchet lever means whenever said selector switch means are positioned for preselecting a lower transmission ratio.

15. Electric control means for synchronized gear shifting in a variable speed gear box for a vehicle driven by a motor having a drive shaft, comprising a gear box having engageable gear members and a driving input shaft driven by said motor shaft and a driven output shaft, means for generating a first electric quantity representing the speed of the driving shaft of the gear box, means for generating a second electric quantity representing the speed of the driven shaft of the gear box, means for comparing said first and second electric quantities derived from said generating means, a plurality of circuit elements being selectably interconnectable between one of said generating means and said comparing means, each of said circuit elements having an electrical characteristic quantity corresponding with a selectable particular transmission ratio of said gear box, said comparing means generating a signal whenever synchronism of the gear members to be coupled has been established, gear shifting means having a plurality of separate inputs and a plurality of actuators each being capable of engaging a corresponding gear, means for actuating said gear shifting means to neutral position of said gear members, each of said gear shifting means inputs being connected for energization when said gear members are in neutral of a particular one of said actuators by said comparing means signal, a number of relay means each comprising a first and a second pair of contacts, the number of said relays being equal to the number of shiftable gears, means for selectably energizing said relays, said first pairs of contacts each being interconnected between one of said generating means and a particular one of said circuit elements and being adapted for accomplishing said selectable interconnection of said circuit elements, said second pairs of contacts being connected for transmitting said signal of said comparing means to a particular input of said gear shifting means, and pulse transforming means connected to said comparing means and extending the pulse length of the signal fed to any of said inputs of said gear shifting means to a period adjusted to meet the inherent activation period of said gear shifting means, said gear shifting means shifting the respective preselected gear without disengaging the driving connection between the driving motor of the vehicle and the driving shaft of the gear box whenever synchronism of the gear members to be coupled has been established.

16. Electric control means for synchronized gear shifting in a variable speed gear box for a vehicle having a driving motor, comprising a gear box having gear members and an input driving shaft and an output driven shaft, means for generating a first electric quantity representing the speed of the driving shaft of the gear box, means for generating a second electric quantity representing the speed of the driven shaft of the gear box, means for comparing said first and second electric quantities derived from said generating means, a plurality of circuit elements each having an electrical characteristic quantity corresponding with a selectable particular transmission ratio, selector switch means for selectably connecting said circuit elements between one of said generating means and said comparing means, said comparing means generating a signal whenever synchronism of the gear members to be coupled has been established, a plurality of electromagnetically actuated valves, means coupled to said selector switch means for feeding said signal to a particular one of said electromagnetically actuated valves for selectively actuating said valves, a plurality of fluid pressure actuators of the differential piston type each connected for control by one of said valves, each of said fluid pressure actuators mounted for operably engaging predetermined gear members, relay means with adjustable holding time being connected to said plurality of fluid pressure actuators and controlling coincidentally energization of all fluid pressure actuators to establish the neutral position of all gear members of the gear box, and pulse transforming means connected to said comparing means and extending the pulse length of said signal fed to a particular one of said electromagnetically operated valves to a period being adjusted to meet the inherent activation period of said pressure actuators, said period exceeding the holding time of said relay means, the energizing one of said actuators engaging the respective preselected gear members when all gear members are in neutral and synchronism of the gear members to be coupled has been established without the driving connection between the driving motor of the vehicle and the driving shaft of the gear box being interrupted.

17. Electric control means for synchronized gear shifting in a motor vehicle variable speed gear box as defined in claim 16, characterized by further switch means being closed automatically upon actuation of said selector switch means and being connected to said relay means for termination of the holding time thereof, and a delay time relay being connected to said pulse transforming means and being activated via said further switch means for terminating said preselected period of extension after a delay time being equal to the time difference between said preselected period of extension and said holding time of said relay means.

18. Electric control means for synchronized gear shifting in a variable speed gear box for a vehicle having a driving motor, comprising a gear box having gear members and an input driving shaft and an output driven shaft, an AC-generator coupled with the driving shaft of the gear box, an AC-generator coupled with the driven shaft of the gear box, separate rectifier means connected to each of the outputs of said generators and delivering direct currents respectively representing the speeds of said driving shaft and said driven shaft, a polarized differential relay having two control windings and having a pair of contacts maintained in closed position during equal energization of said two control windings, a holding relay connected across said pair of contacts, a plurality of resistor means each having a resistance magnitude corresponding with a selectable particular transmission ratio and being selectably interconnectable between one of said control windings and one of said rectifier means by selector switch means, the respective other control winding of said polarized differential relay being directly connected to the respective other rectifier means, an electrical source, said differential relay being connected to said electrical source through said pair of contacts for transmitting a current pulse whenever synchronism of the gear members to be coupled is established, a plurality of electromagnetically actuated valves, means coupled to said selector switch means and being connected to one of said contacts of said differential relay, on the one hand, and to said electromagnetically actuated valves, on the other hand, for transmitting said current pulse to a particular one of said electromagnetically actuated valves, a plurality of fluid pressure actuators of the differential piston type each controlled by one of said valves and arranged to engage predetermined gear members, first relay means with adjustable holding time connected to said plurality of fluid pressure actuators and controlling energization of all fluid pressure actuators to establish the neutral position of all gear members of the gear box, second relay means with adjustable holding time connected between said electrical source and said pair of contacts of said differential relay, a plurality of gear shifting members, switch means coupled to said plurality of gear shifting members and which are closed whenever the gear box has attained its neutral position and connected for providing a current pulse for energizing said second relay means, said holding time of said second relay means being adjusted to meet the inherent activation period of said fluid pressure actuators, said holding time of said second relay means exceeding the holding time of said first relay means, the energized one of said fluid pressure actuators engaging the respective preselected gear members when all gear members are in neutral and when synchronism of the gear members to be coupled has been established without the driving connection between the driving motor of the vehicle and the driving shaft of the gear box being interrupted.

19. Electric control means for synchronized gear shifting in variable speed gear boxes for vehicles with a plurality of driving motors and a corresponding number of identically constructed gear boxes, said electric control means including a plurality of control devices each being related to a particular one of said plurality of gear boxes, each gear box having gear members and an input driving shaft and an output driven shaft, each control device including means for generating a first electric quantity representing the speed of the driving shaft of the respective gear box, means generating a second electric quantity representing the speed of the driven shaft of said gear box, means for comparing said first and second electric quantities derived from said generating means, a plurality of circuit elements being selectably interconnectable between one of said generating means and said comparing means, each of said plurality of circuit elements having an electrical characteristic quantity having a magnitude corresponding with a selectable particular transmission ratio of the respective gear box, said comparing means generating a signal whenever synchronism of the gear members of the respective gear box to be engaged is established, gear shifting means having a plurality of gear shifting members for each gear box, means for actuating said gear shifting means to neutral positions of said gear members, means connecting said gear shifting means for actuation when said gear members are in neutral position in response to said signal from said comparing means, each of said control devices further including pulse transforming means being connected to said comparing means and extending the pulse length of said signal of said comparing means up to a period being adjusted to meet the inherent activation period of said gear shifting means, each of said control devices further including acceleration and deceleration means affecting the speed of said driving shaft of the respective gear box for accomplishing synchronism of the respective gear members of said gear box to be engaged, switch means operably connected to said gear shifting members, the respective acceleration and deceleration means being automatically adjusted for effecting acceleration or deceleration dependent on the presynchronous condition of said comparing means and being connected for energization by said switch means in turn being operated by said plurality of gear shifting members of the respective gear box whenever neutral position of the respective gear box has been attained and subsequently being deenergized by virtue of said signal of the respective comparing means, each of said control devices being provided with a set of switch-over contacts being operated by the respective one of said gear shifting members, the respective sets of switch-over contacts being in equal positions whenever the respective gear boxes have attained equal shifting conditions, said electric control means further including locking means acting on a joint linkage for regulating the fuel supply for said plurality of vehicle motors, said locking means being energized for locking said linkage via said sets of switch-over contacts whenever said gear boxes are in unequal shifting conditions or all have attained their neutral positions, said locking means being deenergized whenever said gear boxes have attained equal engaged positions.

20. Electric control means as defined in claim 19, wherein sets of switch-over contacts are operably connected to be positioned by the gears engaged in said gear boxes, solenoid means for shifting said locking means into locking position when energized, relay means for energizing said solenoid in response to energization thereof, said sets of switch-over contacts being connected for controlling energization of said relay means and said relay means deenergizing said solenoid whenever said sets of switch-over contacts have attained positions corresponding with equally engaged conditions of said gear members.

References Cited
UNITED STATES PATENTS

| | | | |
|---|---|---|---|
| 3,077,121 | 2/1963 | Schaub | 74—472.3 |
| 3,103,826 | 9/1963 | Jaeschke | 74—339 |
| 3,329,038 | 6/1967 | Peras | 74—472.3 |

FRED C. MATTERN, Jr., *Primary Examiner.*

HENRY S. LAYTON, *Assistant Examiner.*

U.S. Cl. X.R.

74—339, 334; 192—.92